United States Patent [19]
Ragle et al.

[11] 4,167,029
[45] Sep. 4, 1979

[54] JET DISTRIBUTOR FOR END-WISE PNEUMATIC PARTITIONING OF DISK PACK

[75] Inventors: Herbert U. Ragle, Thousand Oaks; Dean DeMoss, Camarillo, both of Calif.

[73] Assignee: Burroughs Corporation, Detroit, Mich.

[21] Appl. No.: 890,799

[22] Filed: Mar. 27, 1978

Related U.S. Application Data

[63] Continuation-in-part of Ser. No. 711,647, Aug. 4, 1976, Pat. No. 4,086,640, and Ser. No. 864,011, Dec. 23, 1977, abandoned.

[51] Int. Cl.$^2$ .................... G11B 5/016; G11B 5/82; G11B 25/04
[52] U.S. Cl. ............................ 360/99; 360/98; 360/133
[58] Field of Search ........................ 360/97–99, 360/133–135; 206/444, 312, 137, 134; 209/80.5, 110.5

[56] References Cited

U.S. PATENT DOCUMENTS

| | | | |
|---|---|---|---|
| 1,360,617 | 11/1920 | Brand | 209/110.5 |
| 3,931,644 | 1/1976 | Ward | 360/99 |
| 3,936,880 | 2/1976 | McGinnis et al. | 360/98 |
| 3,947,885 | 3/1976 | McGinnis et al. | 360/98 |
| 3,961,656 | 6/1976 | Aggarwal | 274/47 |
| 3,990,109 | 11/1976 | Seifert | 360/98 |
| 4,011,591 | 3/1977 | Orlando et al. | 360/99 |
| 4,019,204 | 4/1977 | Griffiths et al. | 360/99 |
| 4,051,541 | 9/1977 | McGinnis et al. | 360/98 |

OTHER PUBLICATIONS

IBM Tech. Disc. Bull., vol. 19, No. 1, Jun. 1976, p. 171, Flexible Disk Structure, by A. Orlando.
IBM Tech. Disc. Bull., vol. 20, No. 5, Oct. 1977, Flexible Disk Handling Tool, by Cox et al., p. 1981.

*Primary Examiner*—Alfred H. Eddleman
*Attorney, Agent, or Firm*—John J. McCormack; Nathan Cass; Kevin R. Peterson

[57] ABSTRACT

Disk drive characterized by improved means for partitioning flexible magnetic recording disks with "external" pneumatic director means for selecting a partitioning jet stream and directing it into the pack-hub, and beyond into the gap between any two disks—this means constituting rotationally-stabilized jet-select apparatus and associated jet-distributor structure.

The invention avoids the problems and inconvenience of such alternate techniques as axially positioning a distributor piston within a pack-hub or of rotationally positioning (phasing) a jet nozzle relative to the co-rotating pack.

46 Claims, 10 Drawing Figures

JET DISTRIBUTOR FOR END-WISE PNEUMATIC PARTITIONING OF DISK PACK

CROSS REFERENCE TO RELATED APPLICATIONS

This application is a continuation-in-part of Ser. No. 711,647 filed in the U.S. Patent and Trademark Office on Aug. 4, 1976 and now issued as U.S. Ser. No. 4,086,640, and of Ser. No. 864,011 filed Dec. 23, 1977, (now abandoned in favor of streamlined continuation Ser. No. 960,267, filed Nov. 6, 1978) both filed on behalf of the same inventors, commonly assigned, and herewith incorporated by reference.

This and the following commonly assigned, recently filed patent applications are related to the subject matter of this application and are herewith incorporated by reference.

Ser. No. 711,579 filed: Aug. 4, 1976, now U.S. Pat. No. 4,134,144.

Ser. No. 711,628 filed: Aug. 4, 1976, now U.S. Pat. No. 4,131,443.

Ser. No. 720,905 filed: Sept. 7, 1976 now U.S. Pat. No. 4,136,368.

Ser. No. 720,910 filed: Sept. 7, 1976, now abandoned.

Ser. No. 766,288 filed: Feb. 7, 1977 and now issued as U.S. Pat. No. 4,086,641.

BACKGROUND AND FEATURES OF THE INVENTION

This invention relates to data recording and in particular to novel improved multi-disk arrangements of data records and to associated means for automatically partitioning them.

Workers in the art of generating and using flexible recording disks are aware of its various advantages and shortcomings. As mentioned in the cited U.S. Ser. No. 711,647, magnetic disks have well known advantages, and in the form of "flexible disks" can serve as a "unit record" medium that is compact, light, and is readily transported, stored, and handled, interchangeably with other like disks. Flexible (or "floppy") disks are now widely used in the data processing arts.

Figure 1:
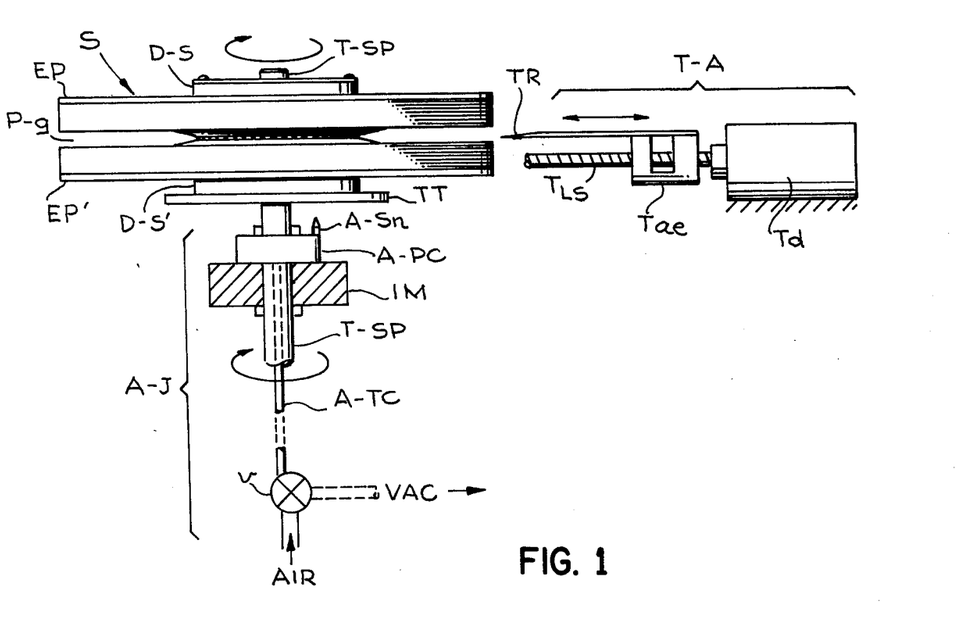

Workers recognize that costs may be reduced in many cases by replacing a rigid magnetic recording disk with a "floppy" disk. Floppy disks can be fashioned from wellknown polyester sheet material (e.g., the familiar polyethylene terephthalate used for magnetic tape) with a magnetic coating thereon—this plastic being simply cut into the shape of a circular disk with a central mounting hole to accommodate the familiar drive-spindle. Packs of such "prior art" floppy disks are well known to workers; e.g., as shown in FIG. 1; with a conventional disk therefrom illustrated in FIG. 2.

The present invention is directed toward improving the design of such "floppy packs" and of associated partition means such that automatic pneumatic partition means may be employed to split the pack and expose any selected disk surface. That is, an improved pneumatic partitioner for a "floppy disk pack" according to the invention is particularly adapted for such automatic partitioning—using surprisingly simple means and methods as described hereinafter.

Prior efforts with flexible disks:

Workers are familiar with prior approaches to the design and manufacture of floppy disks and to related equipment for handling them. Several are described in U.S. Ser. No. 711,647.

Workers are aware that for many applications of floppy disk pack applications, it is of paramount importance to minimize disk cost while yet maintaining accurate, reliable operation. Thus, it is often desirable to fabricate all floppy disks in a pack by a single common pressing operation, with all disks identical—yet still render the disks uniquely "selectable" when collected into a pack. The invention teaches this, and other techniques, using simple partitioning expedients. For example, with the invention a relatively conventional disk pack may be pneumatically partitioned with jet-select means disposed permanently on the associated drive and without locating, or manipulating, mechanical elements within the pack itself.

The present invention is directed toward providing improved multi-disk record units (disk packs) which are better adapted to meet the foregoing problems and objectives in a manner satisfying minimum-cost objectives. The invention maintains the convenience of packaging a number of floppy disks in an "end-wise" partitionable file, while prescribing improved simplified techniques for partitioning with mechanical select elements outside the pack. This file may take the form of a few floppy disks bound together in a portable pack or many "floppies" permanently affixed upon a hollow spindle (either being pneumatically partitioned from within the stack's hub).

As mentioned, the function of partitioning with jet-select means has been proposed heretofore in several, rather problablematical techniques involving the mechanical elements injected into the confines of a floppy disk pack—something which is best avoided for many reasons (e.g., to maintain simplicity of pack construction and interchangeability between packs, etc). One such technique (described in some of the cited applications) involves a perforation of the floppy disks themselves and the intrusion of mechanical "select-fingers" into the confines of the pack. Various disadvantages inhere in such a technique, such as the requirement for completely arresting pack rotation—something ill-advised if one wishes to minimize "access time".

A related jet-select technique (also mentioned in some of the cited applications) locates a distributor piston within the pack-hub and affords "jet-select" by positioning a port opposite a selected inter-disk spacer. The subject invention avoids the problems associated with injecting mechanical means into the confines of the disk pack and operates to switch partition jets between disk spacers with means disposed completely outside the confines of the pack—yet still providing pneumatic, "end-wise" partitioning of the pack.

Workers will appreciate many advantages inhering in this approach to pneumatic partitioning—one being that it uses relatively simple conventional machine elements and can accommodate a relatively conventional flexible pack structure—except, of course, that inter-disk spacers must be apertured in a prescribed pattern.

Most importantly, the invention allows for pneumatic partitioning of a floppy pack without *stopping* the hub—or even slowing it down—and avoids the associated loss of time and energy, etc. The invention also partitions without need for placing a piston within the pack-hub and without any of the related axial-positioning means (such an axially-translatable piston being disclosed in the cited Applications). Such intra-hub pistons complicate pack structure (e.g., either each pack must be made to include such a piston, or else the related drive must be fitted with such a piston and the pack adapted to be coupled to it). And such intra-hub pistons are inherently tricky to position; for instance, the jet orifice must be very precisely located so as to distinguish between two adjacent spacers (separated by a few mils or less), yet without leaking significant jet-air through the adjacent spacer. Also, it is typically problematical to efficiently couple such jet ports to a selected spacer.

The substitution of jet select/distributor means outside the pack instead is advantageous in several respects. It can be combined with an array of apertured spacers for the "end-wise" transmission of the partitioning jet streams and direction thereof to the appropriate inter-disk gap. Thus, this invention brings many obvious advantages, including the ability to relocate mechanical jet-distribution means outside of the crowded confines of the pack, (avoiding crowded conditions and intricate spacing problems). For instance, such an external distributor arrangement allows a designer to *amplify* the translation distance between spacers virtually at will (i.e., make select-translation as widely-spaced as is convenient, such as indicated below with respect to the embodiments of FIG. 3 or FIG. 5). And in special cases it allows a designer to implement gap-selection without any translation or positioning of mechanical parts—a stunning step-forward in the art (e.g., see alternative embodiment below).

The present invention is directed towards providing improved flexible disk pack equipment and associated partitioning means—means which are better adapted to meet the foregoing problems and objectives.

The foregoing and other features, objects and advantages according to the present invention will be more fully appreciated and become more apparent upon consideration of the following description of preferred embodiments, taken in conjunction with the attached drawings, wherein like reference indicia denote like elements.

BRIEF DESCRIPTION OF THE DRAWINGS

FIG. 1 is a rather schematic elevation showing a simplified instructive disk pack arrangement which is "end-wise partitioned", pneumatically, and from within its hub region, with pack rotation means and a transducer assembly indicated in schematic cooperative relation; while

FIG. 6 shows this arrangement in plan, rather schematic, view; while

BACKGROUND OF THE INVENTION

Workers in the art are quite familiar with the design and construction of conventional floppy disks and disk packs as well as associated disk drive and related means to manipulate such disk packs including means for partitioning them. Our cited copending U.S. patent applications give details of such disk packs and related equipment. The cited applications indicate various implementations for the "end-wise partitioning" of a flexible disk pack and disclose partition-apertured disks and associated "end-wise" partitioning means like mechanical ("through-disk") plungers or a pneumatic hub-disposed piston. The following brief description relating to FIGS. 1–4 indicates an example of such pneumatic hub-originated partitioning by way of introduction to embodiments of the invention (e.g., embodiments indicated in FIGS. 5–9 and described below).

Pneumatic, hub-originated partitioning; FIG. 1:

FIG. 1 schematically suggests a disk pack and associated drive adapted for pneumatic "end-wise" partitioning (e.g., versus the above-discussed mechanical mode). Preferably, partitioning is effected from within the stack's hub, or adjacent thereto, as detailed below.

Figure 2:
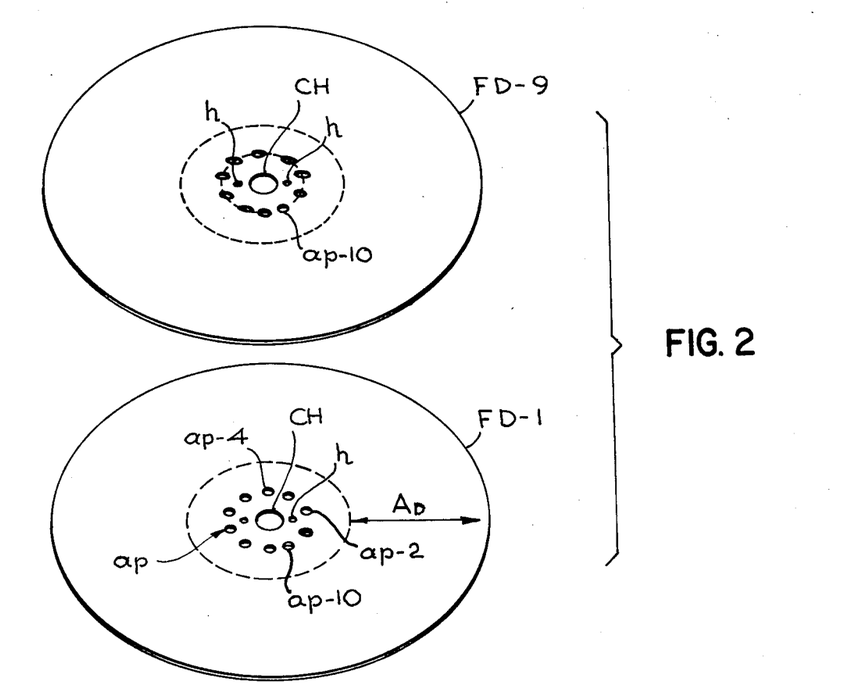
FIG. 2 shows a flexible disk modified therefor.
Figure 3:
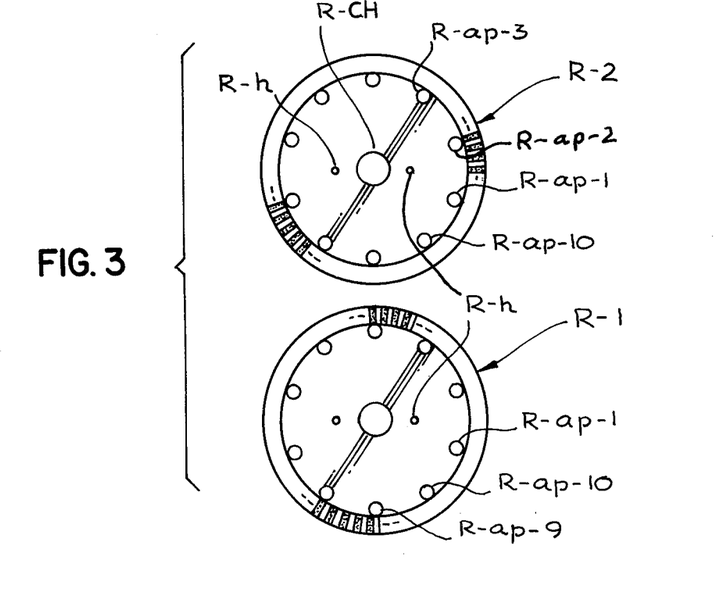
FIG. 3 shows an inter-disk spacer adapted for such partitioning.

Thus, FIG. 1 is a schematic, rather generalized functional showing of a flexible disk pack S mounted on a conventional turntable TT (for relatively high speed rotation) and comprising a stack of flexible disks FD with intermediate washers R, held together between a pair of collars D-S D-S' (see also FIGS. 2, 3). Understood will be pneumatic partition means adapted to pneumatically partition the pack for access entry of a conventional transducer mount TR, adapted for high speed non-contact transduction as generally understood in the art. Here, and elsewhere, the materials, mechanisms and systems alluded to should be understood as conventionally constructed and operated as presently known in the art, except where otherwise mentioned.

In this arrangement a stack of high speed rotated floppy disks will be understood as pneumatically partitioned, "on-the-fly" (without interrupting pack rotation) and "from within" (i.e., adjacent the hub region)—e.g., as opposed to other embodiments involving just a few floppy disks rotated at low speed and bound in a portable cartridge—being adapted to be end-wise partitioned by mechanical means and only when pack rotation is terminated. Workers will appreciate the advantages accruing from non-mechanical internal pneumatic partition means, effecting partitioning "on-the-fly" and without termination of pack rotation—especially as implemented in the below-described "partitioned apertured washer" mode.

Thus, fixed floppy pack AS will be understood as mounted for rotation upon a spindle T-SP and associated turntable TT, pack S comprising a plurality (e.g., here 10) of flexible magnetic recording disks FD separated by washers R which are "partition-apertured" according to this feature of invention (as detailed below and indicated particularly in FIGS. 2 and 3). For illustration purposes, a transducer array T-A is indicated and understood as adapted for selective translation (as indicated by arrow) into, and out of, partition gap p-g between the disks in pack S so as to present a prescribed transducer core array TR in non-contact, transducing relation with a prescribed (upper) disk surface. Pack S is here shown as pneumatically hub-partitioned between disks FD-9 and FD-10 by way of example (see FIG. 4).

According to a related feature, the partitioning air, here, supplied to the hub region by a partition jet assembly A-J is adapted to present a high speed jet of partitioning air end-wise of pack S and entrained up a prescribed one of the bores generated in the array of partitioning-apertured washers and disks, this being controlled according to the rotational position, or indexing, of a delivery jet nozzle A-SN relative to pack S.

Flexible disk pack S will also be understood to be conventionally engaged by a pack rotation assembly for prescribed high speed rotation (the "high performance" systems like those described will be understood to involve disk rotation on the order of at least several thousand rpm). This rotation assembly comprises conventional means, schematically indicated as including a turntable TT and spindle T-SP and an associated drive (e.g., including a motor, belt coupling and associated pulleys and gears, etc., as well understood in the art).

Once pack S is so engaged and so rotated, it is ready for transducer operations on a selected disk, access to which (e.g., by transducer assembly TR, as shown in the art) is best facilitated by a (full or partial) "partitioning", sufficient to expose the selected disk surface to accommodate entry of the transducer mount. Here, it should be appreciated that flexible disk packs like those described are particularly apt for "pneumatic" partitioning by selectable jet-streams directed to a selected (inter-disk, radially apertured) spacer from within the pack-hub as detailed below.

Transducer TR may be of conventional design and is part of a transducer assembly T-A adapted to reciprocate TR (as indicated by the arrow) radially into, and out of, the partition-gap in pack S. The transducer and actuating means may be provided as well known in the art and need not be detailed here. Thus, the transducer mount may be translated axially (e.g., "slaved" to track the partition-select) to seek registry with the plane of a "selected" disk, as is conventional. Transducer/disk loading will preferably be very light (a few grams), and not sufficient to seriously interfere with the separating air-stream between adjacent disks.

By way of example only, an actuation drive motor $T_d$ is indicated as coupled to rotate a lead screw $T_{LS}$ on which the head mounting arm is mounted, being threadably engaged thereto via bracket $T_{ae}$ (see details in U.S. Ser. No. 711,647) for precise translation into the pack (e.g., to access specific tracks on a selected disk surface, as is well known in the art and need not be detailed here). As described below, workers will recognize that the heads may be fixed or be suspended upon compliant means adapted to advantageously interact with the air-separated flexible disks according to the invention.

Disk pack

Flexible disk pack embodiment S will be understood as comprising a dozen (or a few dozen) floppy disks with associated intermediate spacers R (described below; the spacers being "partition-apertured" to render pack S "end-wise partitionable", pneumatically. Pack S is preferably a removable cartridge type (as known in the art) and may include a surrounding jacket or protective envelope (or shroud), with suitable ports for air exchange.

Thus, coaxial stack S comprises commonly-supported, flexible disk records FD, understood as mounted and retained, along with intermediate spacers R between a pair of opposed flexible end-plates EP, EP', being clamped between collars D-S, D-S'. Disks FD are spaced apart a prescribed uniform distance by identical annular radially-vented separator rings R as known in the art.

Rings R and disks FD are "partition apertured" (as are turntable TT, collar D-S' and end-plate EP') as well as clamped firmly between end-plates EP, EP', by opposed collars D-S, D-S'. The disks and spacers may also be pierced (holes h FIGS. 2, 3) to receive coupling means as known in the art (e.g., bolts or rivets to be threaded through holes h in the collars, disks, plates and spacers; or like fastener means used to retain pack S as understood by workers in the art—e.g., preferably including locator-rods as well, though none are illustrated). The inner circumferences of the disks, of the spacers and of the collars, as so stacked and clamped together, are to be relatively congruent, defining the sides of a cylindrical center hole of prescribed diameter and height and adapted to be received on spindle T-SP as known in the art—being rotated on the turntable TT conventionally.

Disks FD; FIG. 2:

Flexible disks FD are of a type known in the art and, as workers will appreciate, may assume various dimensions and compatible constructions. For instance, a well-known polyethelene terephthalate a few mils thick (1.5 mils) is preferred here, with a randomly-oriented ferric oxide coating on at least one side; disk diameter being approximately 12 inches, with a "standard" center-hole diameter about 2.5 inches. The spacers R may comprise accommodating material and dimensions.

Thus, representative disk D, indicated in FIG. 2 will be understood as characterized by an array of partition apertures (see the nine partition apertures ap in FD-1 concentrically disposed about center hole CH), which are disposed adjacent the disk's inner diameter, or hub, rather than its outer diameter. Holes ap will, of course, be understood as adapted to accommodate the "interior pneumatic partitioning" mentioned elsewhere.

Thus, partition holes ap on all disks will be understood as disposed along a common circumferential axis, closely adjacent center hole CH and within the "recording annulus" defined by a radial segment $A_R$. "Coupling holes" h are provided, as mentioned, to accommodate coupling bolts, or like fasteners, connecting the clamping collars.

According to the preferred construction here indicated, the pattern of partition apertures is arranged and cut-out to be unique for each spacer so that all disks (aperture pattern) may be alike. However, for manufacturing and assembly convenience, workers may use other modes. Thus, here—as before—there is a prescribed number of partition gaps possible and an associated number of aperture sites—the latter being the same for all disks and in registry when the pack is assembled.

Here, nine (9) inter-disk gaps p-g are possible, so there are nine (9) aperture sites. All sites are cut-out in the "bottom spacer" (closest to air jet—here spacer R-1, next to disk FD-1), while none are cut-out for the "top spacer" (farthest from air jet—here, R-11—FIG. 3); with the number cut-out increasing between these two (e.g., eight cut-out on R-3, seven on R-4, etc., with one cut-out on R-11).

Of course, as mentioned below, the disks are stacked together with the intermediate similarly-apertured spacers so that these nine ap sites register along the stack of disks to form nine "partition bores" as in the preceding embodiments; each bore being a different length and thus terminating at a different disk.

Flexible disks FD will be understood as operating between a pair of flexible stabilizer end-plates EP, EP', preferably comprising a plurality of contiguous flexible recording disks 55 (identical to the record disks, except that no magnetic coating is needed). Plates EP, EP' fix the pack position axially and remain quite flat, being held by centrifugal forces. For instance, in one embodiment, with a pack comprising from 10–20 polyester disks 1.5 mil thick separated by 10 mil spacers, satisfactory end-plates are formed.

Of course, it will be understood that, preferably and in most cases, "dummy" disks and associated intermediate spacers (i.e., a pair of "dummy packs") will also be provided at the top and bottom of the record stack (here, adjacent FD-1 and FD-10 respectively) to accommodate a projected full partitioning deflection of record disks—especially the outboard disks FD-1, FD-10. In this case the partition gap p-g is projected at about 150 mils; accordingly, a "dummy pack" D, D' (FIG. 27) will be provided, top and bottom, each sufficient to accommodate a 75 mil deflection (as compressed by the deflection forces, with essentially no gap between dummy disks).

Spacers; FIG. 3:

Spacers R will be understood as adapted to maintain disks axially spaced a prescribed uniform separation distance (here, about 10 to 20 mils preferably). The spacers are vented radially (see peripheral hatching FIG. 3) to allow recording disks to be normally separated and lubricated by a thin film of air, as well as serving, during special partition times, to pass the partitioning air jet. The spacers R are also partition-apertured as indicated above (and further detailed in U.S. Ser. No. 864,011) to accommodate the recited interior pneumatic partitioning. The "blind-ended" partition bores are preferably generated using a different hole pattern for each spacer and associated like disk holes.

Figure 4:
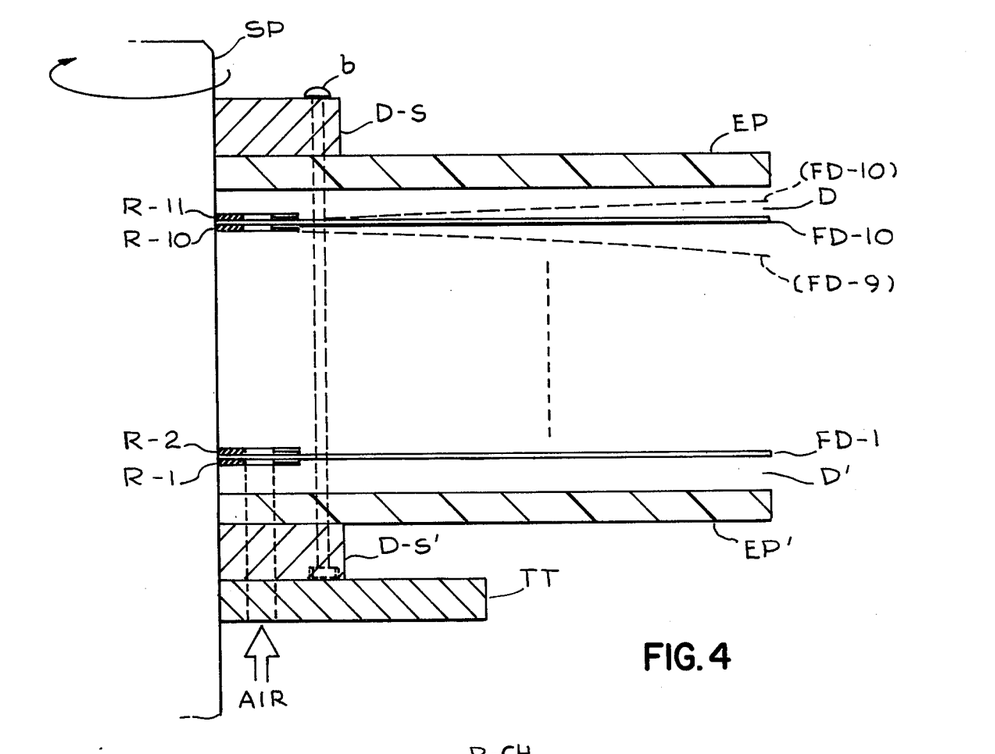
FIG. 4 is an enlarged partial side section of a disk pack as in FIG. 1 schematically indicating apertured spacers, turntable, etc.

More particularly, and with reference to FIG. 4, spacers R will be understood as arrayed in a stack with flexible disks FD therebetween, as indicated (see spacers R-1 through R-11, disks FD-1 through FD-10). That is, for example, an array of partition apertures, R-ap is formed about a prescribed inner circumferential locus about spacer-washer R-1, having center hole R-CH adapted to fit the turntable spindle and an outer diameter sufficient to perform the conventional spacing and mounting functions as well as the added novel function of delivering partition air to a prescribed interdisk gap. Apertures R-ap may be distributed in any number or spacing (preferably uniformly) about the annulus. Preferably, the companion washers R-2 through R-11 are so partition-apertured in the identical, registering manner. A like array of spacers are provided between the "dummy disks" but only the bottom ones (D') need be partition-apertured.

Partition jet (FIG. 1):

A pressurized air supply (source not shown but well understood in the art) is adapted to be delivered through a conduit, a valve v and hollow center tube A-TC, as known in the art. In this way pressurized air (gas) is delivered to a prescribed sump chamber A-PC, including an associated delivery nozzle A-SN, both understood as co-rotated with pack AS and sealed to fixed central tube via air-tight couplings as known in the art. The nozzle A-SN may be indexed selectively to different circumferential positions about the pack by rotary actuator (phase adjust means) IM, as known in the art. (Rotating chamber A-PC being thus in pneumatic communication with fixed hollow tube A-TC, mounted centrally within hollow spindle T-SP). Here, delivery of the air is effected up through hollow tube A-TC. In particular (and referring to the embodiments of FIGS. 1 and 2), it may be assumed that the partition between disks AD-1, AD-2 is effected by positioning the jet delivery nozzle rotationally with respect to pack AS so as to register with a selected bore (through TT, EP', dummy and record disks as well as intermediate spacers). This jet stream is directed upward through all the intervening spacers and disks to exit, radially, through the washer opposite the "selected" partition gap.

The operation of the elements indicated in FIGS. 1–4 will be apparent to those skilled in the art and in any event are particularly described by way of example in the cited U.S. application (U.S. Ser. No. 864,011).

DESCRIPTION OF PREFERRED EMBODIMENTS

Figure 5:
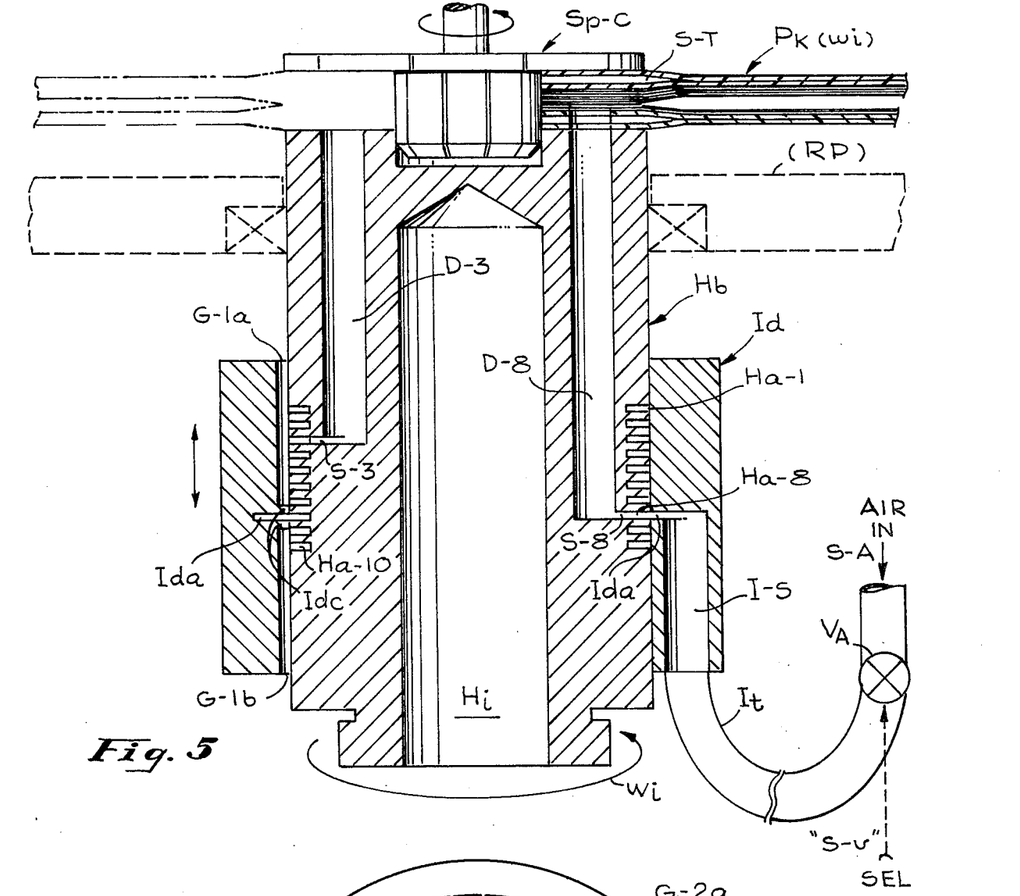
FIG. 5 is a side elevation in partial section of a disk pack similar to that in FIG. 1 mounted in operative relation with one embodiment of a partitioning air supply-distributor arrangement according to one embodiment of the invention.

FIG. 5 illustrates an internal pneumatic partitioning means, modified and adapted, according to a preferred embodiment, to pneumatically partition the disks of a prescribed flexible disk pack Pk like those aforedescribed except as otherwise noted. Pack Pk will be understood as conventionally rotated (e.g., being coupled to an upper insertable expandable coupling hub SP-C, as known in the art). The disks are adapted to be "centrifugally flattened" (as schematically indicated in FIG. 5) when rotated at the prescribed speed (e.g., several thousand rpm or more). Conversely, they will droop downwardly to rest upon a platform (indicated at RP, in phantom), conventionally provided, when pack-rotation ceases. Partition-gaps will be opened, selectably, between the disks of pack Pk in the manner aforedescribed except as otherwise specified below (e.g., gap $g_{1-2}$ between disks FD-1, FD-2). Rotation of pack Pk is preferably initiated from below, via a "distributor tube" $H_b$, which is rotated conventionally in synchronism with pack Pk (i.e., at $W_i$ rpm, and by means not shown, but well known in the art; such as spindle means fitting into the hollow interior H-i of tube $H_b$).

Figure 6:
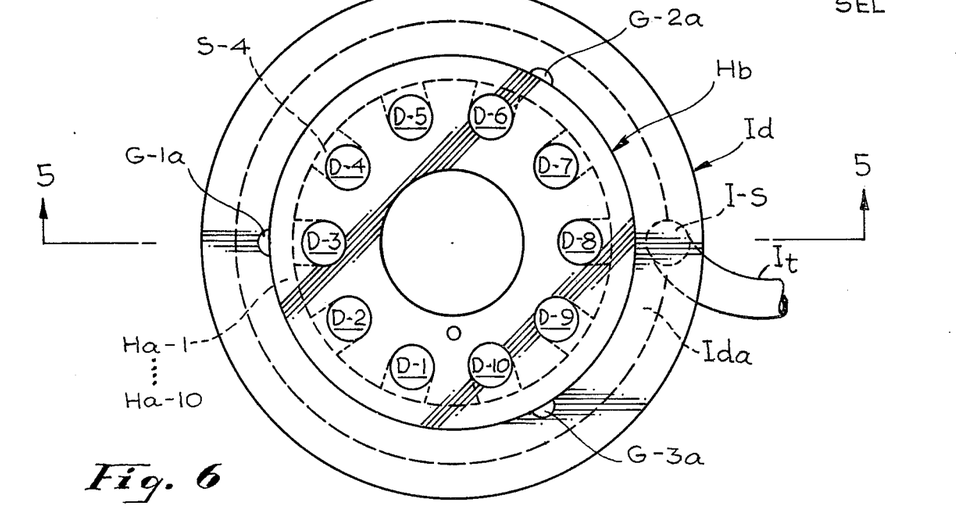
Figure 7:
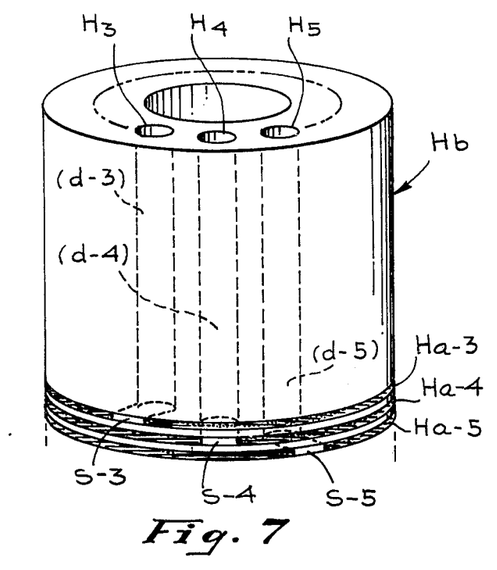
FIG. 7 is a side perspective and partial illustrative showing of details of the distributor-hub portion of this arrangement.

The "external" jet-select/distributor means indicated in FIGS. 5–7 is a simple embodiment. It may be simplistically conceived as a pair of concentric hollow cylinders $H_b$, $I_d$ functioning as a non-rotating jet-select means $I_d$ and a cooperating jet-distributor means $H_b$ co-rotated with pack Pk. The distributor $H_b$ can be visualized as housing a circumferential array of communicating ducts (each communicating with one of the spacer-bores to exit at an associated inter-disk gap). Cylinder $H_b$ is surrounded by outer "Select-cylinder" $I_d$ connected to a source of pressurized air and adapted to be translated axially of cylinder $H_b$ so as to selectively couple pressurized air, pneumatically, to one of these ducts—the pressurized air source operating in a continuous mode, (though it may, optionally, be pulsed in certain instances).

Figure 8:
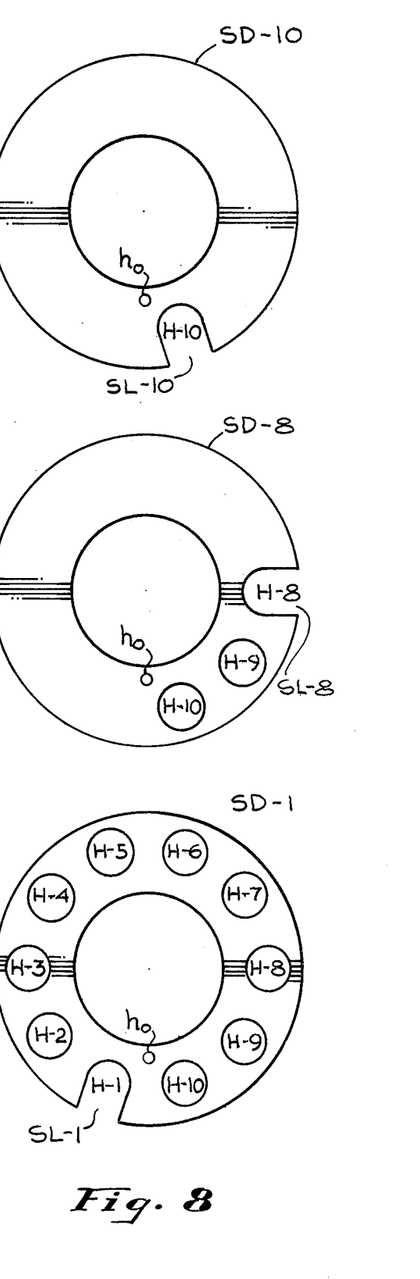
FIG. 8 shows in plan view some of the partition-spacers adapted for use in the embodiment of FIGS. 5 to 7.

More particularly, a preferred form of inner "Distributor cylinder" $H_b$ will be understood as the embodiment shown (cross-sectionally) in FIG. 5 in combination with pack Pk and outer cylinder $I_d$—the cylinders being shown in plan view in FIG. 6, with the inner cylinder shown in the upper elevation of FIG. 7. FIG. 8 shows the associated stack of spacers SD fragmentarily. Distributor $H_b$ is a bore conduit and may be hollowed-out inwardly, as shown, to minimize mass.

Thus, considering FIGS. 5–8 workers will appreciate that an array of ducts D are disposed about the center of inner cylinder $H_b$, each having the same cylindrical cross-section and being adapted to communicate with a respective one of the bores formed by the registered partition-apertures H of spacers SD—each one of these bores terminating adjacent a respective inter-disk gap and communicating radially therewith, via a spacer cut-out SL.

Spacers, FIG. 8:

As suggested, in this embodiment (FIGS. 5–8), eleven spacer disks are preferably provided for a 10-disk pack, with partition apertures H-1 through H-10 provided in the bottom-most spacer SD, and with each successive spacer thereabove eliminating one more aperture. Thus, as FIG. 8 suggests, spacer SD-2 eliminates aperture H-1; SD-3 eliminates H-1 plus H-2..., concluding with SD-8 which eliminates H-1 through H-7, and SD-10 which eliminates H-1 through H-9. The uppermost spacer SD-11 has no apertures H, of course. The aperture-bores are formed by registering like-numbered apertures H in stacking the pack. Each bore extends a different, unique distance, up through the pack, to exit opposite a different respective inter-disk gap g with which it is in pneumatic communication.

An extra hole $h_o$ is preferably supplied in all the spacers SD to assure pack registration. When stacked in registration, aligned holes $h_o$ may form a bore to receive an alignment pin on the hub. Workers may eliminate this in favor of other known means.

Thus, in this preferred embodiment there are 9 "inter-disk" spacers, SD-1 through SD-10—each having a different respective radial communication (slotting SL) to communicate pneumatically with the corresponding inter-disk gap—e.g., slotting SL-1 communicating apertures H-1 with the gap $g_{1-2}$ between disks FD-1 and FD-2.

Of course, alternatively, the spacers SD may be separate from the inter-disk spacers, which in turn may be separately radially apertured as in prior art embodiments.

Distributor post $H_b$: FIGS. 5–7:

As mentioned, the Distributor $H_b$ performs the functions, among others, of communicating air-jet pressure to respective ones of these spacer-bores and communicating inter-disk gaps (along with such other functions as providing quiescent, "isolation air" flow; see below). Preferably,—and according to a feature hereof—this is carried-out in a manner which accommodates a prescribed convenient translation of Selector $I_d$ along tube $H_b$ (e.g., at convenient spaced intervals adapted to register the exit port thereof with a selected intra-tube conduit D).

Thus, here ducts D in $H_b$ are each accessed via an associated annulus Ha and communicating inlet port S along the tube periphery. And so, inlet-grooves Ha are preferably arrayed along the axial length of $H_b$ at prescribed convenient (regular) intervals—each defining an access location which is convenient for access by the (outlet port portion of) "Select-cylinder" $I_d$ as seen below. Accordingly, ducts D are each arranged to terminate at different respective inlet ports S, communicating with a respective associated peripheral groove Ha. So, here there will be ten such inlet ports and associated grooves spaced, each disposed at a prescribed axial position along the exterior of cylinder $H_b$. FIG. 7 shows rather schematically and exemplarily, port S-3 and groove Ha-3 associated with duct D-3, as well as port S-4 and groove Ha-4 associated with D-4; and port S-5 and groove Ha-5 associated with duct D-5, (see also FIG. 6 indicating the phantom outline of grooves Ha). Workers should note that such a "distributor" affords a unique, valuable versatility, allowing one to "lead" the "bore-intakes" outside the pack confines and locate each intake virtually at will:—e.g., distributing ports S along tube $H_b$ as widely spaced as one chooses—making the design and operation of select tube $I_d$ simple and a matter of choice and "mechanically amplifying" the inter-bore separation.

It will be understood that, with cylinder $H'_b$ kept continually rotating, yet with sleeve $I_d$ fixed, it is necessary to provide grooves Ha to keep the burst of partitioning-air in continual communication between conduit t and duct D—otherwise only a brief, momentary jet-pulse would be communicated into duct D (i.e., when associated port S was registered as it passed the intake port $I_{da}$).

"Selector" Sleeve $I_d$; FIGS. 5,6:

The "Selector", an external hollow cylinder (jet-select means) or sleeve $I_d$, cooperates as described—and according to this invention—with companion cylinder $H_b$ so as to, among other things, direct a pressurizing jet pulse through a selected one of ducts D and through its corresponding gap. Sleeve $I_d$ also provides "isolating air" through all the other ducts and gaps the while—doing this in a particularly ingenious, uncomplicated manner, using simple components. For instance, sleeve $I_d$ may simply be linearly translated by convenient increments to effect "jet-select" without, for example, being required to rotate with pack Pk (as inner cylinder $H_b$ is)—and without even being required to be rotated about cylinder $H_b$ (e.g., as contra-distinguished from the "jet-select" mode of cited U.S. Ser. No. 864,011).

Thus, as indicated in FIGS. 5 and 6 sleeve $I_d$ is disposed in sliding, relatively gas-tight relation on the periphery of inner cylinder $H_b$, and is arranged and adapted to be translated therealong to effect "gap-partition-selection" (by means not shown or described but well known in the art) but to be fixed rotationally (i.e., not co-rotate with $H_b$ and the pack). Axial translation of sleeve $I_d$ is effected so as to register a prescribed jet-transmitting outlet with a selected intake (port S) along inner tube $H_b$ and so—quite simply—effect "partition select". This outlet comprises annular groove $I_{da}$ about the inner periphery of hollow sleeve $I_d$ dimensioned to register with any of like annular grooves Ha about cylinder $H_b$. [Grooves Ha thus are about the same height as groove $I_{da}$ so as to be placed in relatively air-tight pneumatic communication therewith]. Groove $I_{da}$ communicates with the jet stream via plenum I-S and tube $I_t$ connected to the source of pressurized air. Chamber I-S in sleeve $I_d$ thus connects tube $I_t$ to outlet $I_{da}$. Inlet hose $I_t$ is preferably extensible and flexible, and is connected to the source of pressurized air S-A via valve means $V_A$ as seen in FIG. 5 (details not indicated but conventionally provided as known in the art).

Thus, according to one feature of advantage, a stream of pressurized partitioning jet-air may be applied relatively conveniently, and omnidirectionally, to a selected one of ducts D in rotating tube $H_d$, being introduced simply through an inlet hose [and needing no rotational indexing—e.g., as in cited U.S. Ser. No. 864,011]. Moreover, as workers will readily appreciate, the gaps between intake grooves Ha may be located virtually at will along cylinder $H_b$. Preferably, grooves Ha are uniformly spaced down $H_b$ a suitable distance which is compatible with the simple, efficient, reliable translation of "Select tube" $I_d$.

Such freedom of design will greatly interest workers in this art who have heretofore found it necessary to achieve like results using relatively inconvenient selection expedients, such as piston means mounted inside the pack hub—this necessitating a fussy linear translation of this piston along the tiny, inter-disk, spacing, while it is nonetheless kept co-rotated with the pack and in pneumatic communication with a source of pressurized air, etc. The invention avoids this by bringing bore-intakes outside the pack.

"Isolation-air" via tube $I_d$ (FIGS. 5, 6):

According to another preferred feature hereof, Select cylinder $I_d$ also operates in conjunction with the mentioned inlet grooves Ha and associated ports S to supply a continuous stream of "isolation air" between all "non-selected" disk gaps. For this purpose an array of "breather slots" G are cut longitudinally along the inner periphery of "Selector tube" $I_d$—such as the three slots G-1, G-2, G-3 indicated in FIGS. 5 and 6 as symmetrically disposed about tube $I_d$ (upper portions G-1a, G-2a, G-3a being called-out in FIG. 6). These slots cooperate (along their upper and lower portions, about the intervening upper and lower breather plugs $I_{dc}$) to vent prescribed "non-selected" grooves Ha to the ambient atmosphere—whereupon the natural centrifugal "sucking" action in the inter-disk gaps g may draw-in ambient air, up these grooves and their associated ducts D.

More particularly, as indicated in FIG. 5, each of the breather slots G (G-1 illustrated) is split into an upper and lower portion (G-1a, G-1b) by a pair of plugs $I_{dc}$ adapted to prevent pressurized air from entering slots G or the "non-selected" ducts—whereby to draw-in ambient air above and below pressurized-intake groove $I_{da}$.

The upper slot portions (G-1a, G-2a, G-3a) will be understood, here, as "venting" the "upper", non-selected ducts [i.e., in FIG. 5 ducts D-1 through D-7, and their associated grooves Ha, which lie above the illustrated "selected groove" H-8, are vented to ambient air]. Similarly, the "lower" or "non-selected ducts" [in FIG. 5: D-9, D-10 and their respective grooves Ha] are likewise "vented" by the lower slot portions (G-1b, G-2b, G-3b). Workers will visualize other related vent means for the "non-selected inter-disk gaps" in such a pack. Workers in the art will appreciate how simply this is performed; with so very little modification of parts—merely a slotting of the Select tube's periphery. Of course, breather inlets may be otherwise provided. Also, certain of the gaps adjacent a "selected gap" can also be shut-off in such an array—by simply extending the coupling structure $I_{dc}$ above and below the selected annulus a sufficient distance.

Operation (FIGS. 5-8):

An exemplary operational sequence for the embodiment of FIGS. 5-8 will now be described. It will be assumed that one desires to open a partitioning gap at $g_{7-8}$, (between disks FD-7 and FD-8 corresponding to the location of spacer SD-8); thus the following operations are invoked:

Step 1: Position Sleeve $I_d$:

A "partition-select" (disk-select) signal "p-s" is applied to the subject Disk Drive, causing generation of a translate signal "T-S", adapted to cause associated linear actuation means (not shown, but well understood in the art) to translate "SELECT sleeve" $I_d$ so as to register exit-annulus $I_{da}$ thereof in relatively air-tight relation with groove Ha-8.

Step 2: Pulse-in Air:

Once this sleeve registration is achieved, a related "air-on" signal "s-v" is applied to open valve $V_A$ (e.g., signal "s-v" can be generated and enabled by appropriate logic indicating this registration along with related preconditions). Signal "s-v" causes valve $V_A$ to be "actuated-OPEN" for a prescribed pulse period ($t_p$)—sending a prescribed, timed pulse of partitioning air from source S-A down inlet tube $I_t$. This jet pulse will issue through plenum chamber I-s to exit via groove $I_{da}$ into the "now-registered" facing groove Ha-8. This partition-jet enters duct D-8 via port S-8 and is conducted up D-8 to issue through the bore formed by registered spacer holes H-8 (registered with D-8). This jet pulse will exit therefrom, via exit slot SL-8 in spacer SD-8 (spanning selected gap $g_{7-8}$) to open the associated partition gap ($g_{7-8}$).

All the while (e.g., while tube $I_d$ is so moved and while this jet-pulse is sent to issue through gap $g_{7-8}$), "isolation-air" is being sucked-in to all ducts, etc. (grooves Ha, etc.) not blocked by the breather plugs $I_{dc}$, flanking Ha-8—thus grooves Ha-1 through Ha-7 suck-in ambient air via slots G-1a, G-2a, G-3a; and grooves Ha-9, Ha-10 suck-in via slots G-1b, G-2b, G-3b.

Workers will see how this embodiment (FIGS. 5-8) provides the indicated results. Workers will also appreciate the bistable character of the partitioning so facilitated—whereby a gap is opened—and "held open"—by a partitioning jet pulse for a prescribed time (at least sufficient to open the desired partitioning gap the desired amount). This jet pulse may thereafter be terminated—yet the partition gap will remain "open" until a supervening, reverse force is brought to bear (on the surrounding disks).

Such a bistability (a sort of "partition hysteresis", whereby an open gap is held OPEN, and a closed gap is held CLOSED), is quite advantageous when operatively associated with partitioning means like that taught herein. For instance, if a given configuration will "open" at about 10 cfm jet flow (standardized pressure, etc.), it may be caused to "close" only when the flow is dropped considerably (e.g., at 5 cfm).

Also, in certain instances, a transient "pulsed" partition jet may be very advantageous [e.g., where a jet pulse opens the partition gap and then terminates during transducer operations]. In such a case, "anticipatory partitioning" may be accommodated. That is, once a given gap is opened, and where the next partitioning operation is to be undertaken between another pair of disks in the same pack, cylinder $I_d$ may be translated to its new partition-position (along cylinder $H_b$) while the first gap is operated on, and before it is closed. Also, such an "anticipatory-translation" need not send false bursts of partition air up through the intermediate ducts (grooves Ha) passed-over during this translation.

To illustrate: if, in such an instance, partitioning were completed at SD-8 and the next partition were scheduled at SD-3 (jet pulse to be applied via duct D-3, groove Ha-3, etc.), then cylinder $I_d$ could be shifted from registration with groove Ha-8 to register with groove Ha-3 before transducing at $g_{7-8}$ were completed—and, as groove $I_{da}$ passed the intervening grooves (Ha-7, Ha-6, etc.), being "quiescent" the while (unpressurized), it will not issue "false" jet bursts up the associated conduits (D-7, D-6, etc.). Of course, valve $V_A$ would be "closed" the while, so that inlet $I_t$ would not have a continuous pressurized supply of air impressed thereon (valve $V_A$ having been closed after the brief jet pulse into D-8, and not opened again until D-3 is reached).

Figure 9:
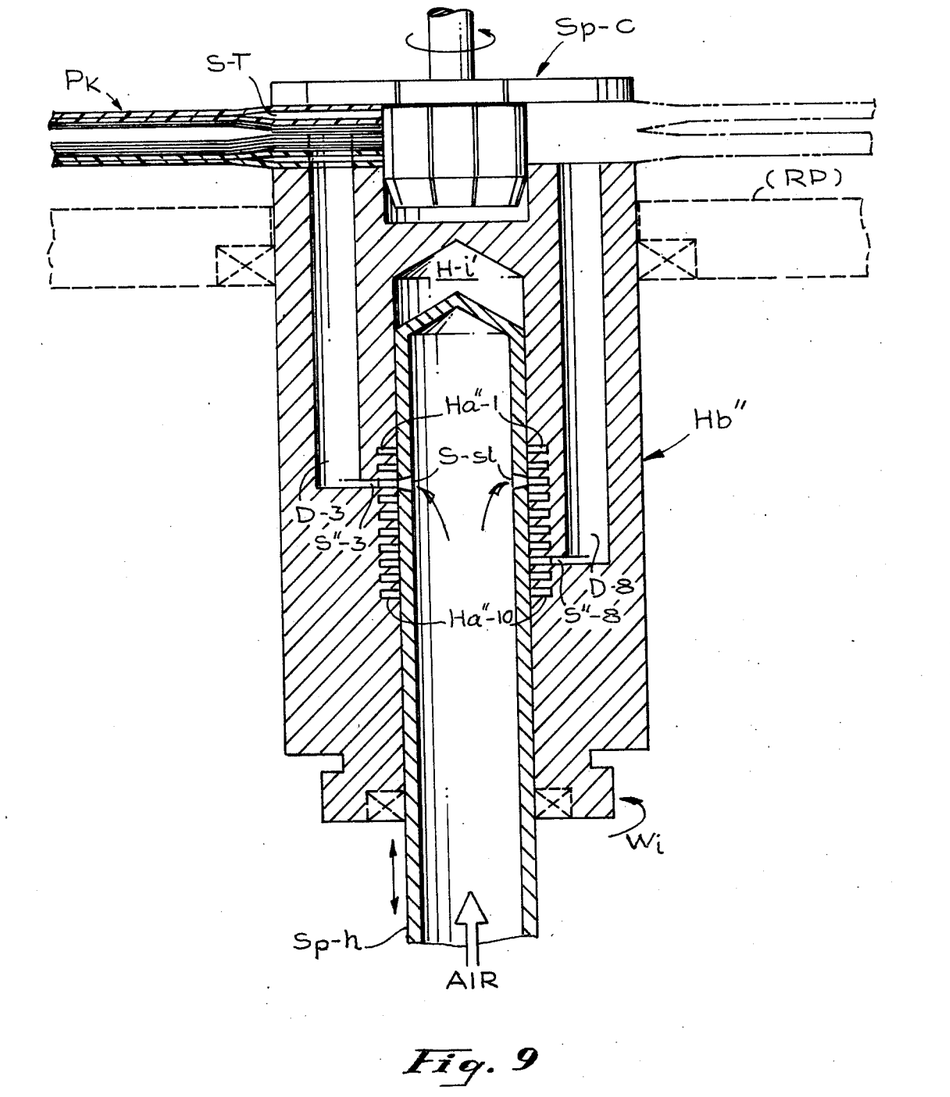
FIG. 9 shows an alternate supply-distributor arrangement modified from that shown in FIG. 5.

Alternate embodiment: FIG. 9:

Turning now to FIG. 9, there is illustrated an alternate embodiment after the manner of the (similarly-illustrated) embodiment in FIG. 5. It will be understood as constructed and operated the same except as otherwise specified.

Among other things, this embodiment substitutes an inner select tube Sp-h for the "selective-sleeve" $I_d$ in FIG. 5, etc. Also, it modifies the inlets (Ha, S) to ducts D accordingly; i.e., to face inwardly, in communication with tube Sp-h (exit-port S-sl thereof), as illustrated. Tube Sp-h is disposed within the hollow center, H-i' of "Distributor tube" $H_b$, in relatively gas-tight relation therewith, at least along periphery of intake ports (semi-annular grooves or slits S-sl). The pressurized partition air is understood as to be selectively supplied up through the hollow center of tube Sp-h (by means not detailed here, but well known in the art).

"Select tube" Sp-h may comprise part of the rotation assembly for rotating outer tube $H_b$ and the rest of the pack assembly (in which case it will be rotationally coupled in gas-tight relation with a supply of pressurized air, as known in the art). Or alternatively tube Sp-h may be kept stationary, as with the embodiment in FIG. 5, tube $H_b$ and the pack being rotated by other means as known in the art.

Of course, the breather slots (grooves G-1 through G-3, in FIGS. 5–7) may be similarly provided along the length of tube Sp-h; however, the upper, innermost portion of the hollow core H-i' of tube $H_b$ must, in such a case, be relieved to provide atmospheric air (venting to feed the upper-slots communicating with the "upper grooves" disposed above a "selected groove" registered with inlet slits S-sl, in the manner of the prior embodiment). Alternate means of providing isolation air (with this or the other embodiments) will also occur to those skilled in the art.

Figure 10:
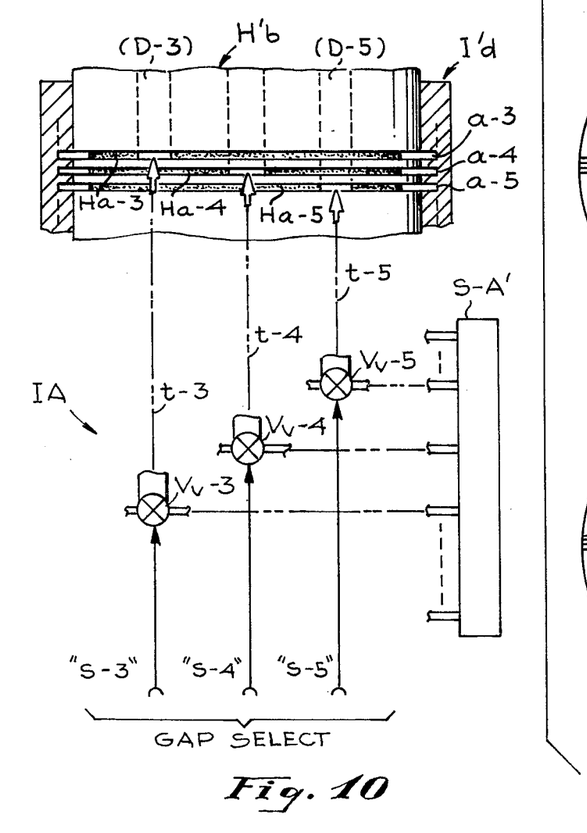
FIG. 10 shows a second alternate supply-distributor embodiment modified from that indicated in FIGS. 5 and 9 and adapted to provide jet selection without mechanical positioning or translation of parts.

Second alternate embodiment: FIG. 10:

FIG. 10 illustrates yet another modification of the preceding embodiments. This embodiment will be understood as constructed and operated in the same manner as that of FIGS. 5–8, except as otherwise specified. Here, as a principle modification, the outer "Select sleeve" $I_d$ of FIGS. 5–7 is modified so as to be completely stationary (and not be linearly translated for duct-selection); being provided with an array IA of air supply tubes t, each tube being operatively associated with a respective valve $V_v$ adapted to selectively apply pressurized air thereto from a common source (see manifold S-A'). Each tube t will, in turn, communicate with a respective duct (groove Ha, duct D and associated intermediate port S communicating therebetween).

Thus, FIG. 10 shows a modified inner Distributor cylinder $H'_b$ constructed and operating relatively the same as the embodiment of FIGS. 5–7 (except as otherwise described), here being surrounded by a stationary hollow "Select sleeve" $I'_d$. Sleeve $I_d$ may optionally include an array of annular grooves a-1, a-2, etc., each registered with, and in pneumatic relatively gas-tight communication with, a respective one of the grooves Ha on the periphery of cylinder $H'_b$. Fixed sleeve $I'_d$ is connected to fixed intake assembly IA, and neither $I'_d$ nor IA are rotated or linearly translated (e.g., relative to $H'_b$). An array of intake air-conduits (tubes t) are thus connected to sleeve $I'_d$, each communicating with a respective groove Ha (and a, if used). For instance, groove a-1, in pneumatic registry and communication with inner groove Ha-1, is shown pneumatically coupled to associate intake tube t-1, with t-1 connected to the pressurized-air manifold S-A', via an associated valve $V_v$-1. Similarly, grooves Ha-3/a-3 are to be selectively pressurized, through valve $V_v$-3, via tube t-3; grooves Ha-4/a-4 through valve $V_v$-4 via tube t-4, as illustrated in FIG. 10, and so forth.

A gap-select system may be conventionally provided to generate and apply valve-opening signals, S-1 through S-10, to a valve $V_v$ for the pulsed-opening thereof when partitioning is to be initiated at a corresponding gap—e.g., signal S-5 to open valve $V_v$-5, and jet pulse tube t-5, then grooves a-5/Ha-5, duct D-5 via port S-5, to bore-holes H-5, exiting at spacer SD-5, thereby opening a partition gap $g_{5-6}$, between FD-5, FD-6. However, here isolation-air must be differently provided in such a system. For instance, each of the valve $V_v$ may easily be made to selectively "vent" to ambient air pressure all the time except when "selected" (i.e., except when called upon to pressurize their gap with a partition-air pulse)—according to yet another feature!

Thus, by way of illustrating operation of the FIG. 10 array, assume one wishes to partition at the gap $g_{5-6}$ of spacer SD-5—with a pressurized pulse to be sent up duct D-5 through the bore formed by spacer apertures H-5 to exit through SD-5, etc. For this, a prescribed valve-opening signal "s-5" (from Gap-Select control means, not illustrated but implemented as understood in the art) will be understood as applied to open valve $V_v$-5 for a prescribed period. This will send a burst of pressurized air from manifold S-A' down through tube t-5 to be thrust about groove a-5 and over to facing groove Ha-5, so as to enter duct D-5, via inlet port S-5, (in the manner of the embodiment of FIG. 5).

Additionally, and preferably, the exit port for each tube t is adapted to be selectively coupled into relatively air-tight communication with its associated annular groove Ha. Preferably this air-tight coupling is achieved by mounting the cylindrical sleeve $I'_d$ in air-tight relation about the periphery of cylinder $H'_b$. Where needed, additional seal means may be conventionally provided. For instance, each tube t may be operatively associated with an annular ring with groove a and made pliable, to be selectively actuated, radially-into, cylinder $H'_b$ during partition—the grooved ring adapted to surround the associated groove a and seal during the period of selection/pressurization.

Workers in the art will reflect upon the merits of such a relatively fixed "Distribution/Select" arrangement, like array IA in FIG. 10—an array which need not be translated axially of the distributor $H'_b$, thus avoiding the attendant prolongation of access time and avoiding problems of misregistration during translation, etc.—yet providing some very distinct and remarkable advantages, as well as greatly simplifying the "SELECT" function.

Importantly, selection and associated pressurization of ducts D may even be made simultaneously with this embodiment, or they may be otherwise pressurized asynchronous of one another—whereas using an embodiment like those in FIGS. 5–7 or 9, etc., only one duct may be pressurized at any one time (serially), and only at relatively widely separated intervals. Workers will thus note that such a modification further reduces access time for each partitioning and also makes it possible to partition any number of gaps simultaneously—something strikingly novel!

The results achievable with arrangements like the described embodiments will be gratifying to workers in the art; for instance, the desirable "end-wise", "hub-oriented" pneumatic "extra-pack" partitioning—one achieved with only a few conventional elements, involving the delivery of partition-air simply by registering a tubular (or like) select-means with a "ducted-cylinder" and registering spacer bores—or alternatively by opening individual jet-duct systems associated with each duct.

Other embodiments:

While some described embodiments have preferably involved a removable cartridge (form of floppy disk pack), workers will understand that the instant invention may be used with any such disk arrangements, such as a fixed array of floppy disks stacked fixed along a prescribed (horizontal or vertical) axis and susceptible of hub-originated pneumatic, "end-wise" partitioning. Also, in some cases related rigid disks, or other configurations may be similarly partitioned and similarly manipulated.

Workers in the art will recognize many features of advantage and surprising novel utility deriving from device design and construction along the described lines. They will recognize that, using such designs, pack structure may be eliminated or made standard—the associated jet delivery/select array of ducts, etc., being simple to manufacture and convenient to use. And where disks and spacers may not be partition-apertured, one may substitute a like-apertured hub.

A variety of packs will be seen adapted for advantageous interaction with such central pneumatic partition-delivery means of the type described, wherein the natural centrifugal pumping action of the pack under high speed rotation assists in establishing a stable air film-separation of disks, while also assisting in pneumatic partitioning. The versatile, fast, simple partition control facilitated (e.g., with a simple, quick cylinder indexing) will be appreciated, especially since it affords a partition which is entirely pneumatic, with no intrusion of mechanical elements into the pack, (e.g., none translated within the hub). The flexible disk packs and associated manipulation means contemplated herein will be understood by workers in the art to have special utility for certain "high performance" (high rpm), out-of contact recording applications.

It will be understood that the preferred embodiments described herein are only exemplary, and that the invention is capable of many modification and variations in construction, arrangement and use without departing from the spirit of the concepts taught. As an example of further modifications, the means and methods disclosed herein may, in certain cases, also be applicable with certain other transducing systems and the like, as well as being applicable in conjunction with other supplementary partition means.

All variations of the invention being merely illustrative, the invention should be considered as including all possible modifications and variations coming within the scope of the invention as defined by the appended claims.

What is claimed is:

1. An improved pneumatic partitioning arrangement adapted to partition a flexible disk pack, end-wise, this pack being characterized by an array of partition-bores extending axially through the pack cross-section, each bore terminating at a different inter-disk gap for conducting separating air thereto;

this arrangement comprising, in combination therewith:
   bore-select means disposed externally of said pack in relatively stationary, rotational stabilized relation with respect thereto; and
   pneumatic conduction means arranged in operative relation with this select means, and adapted to couple a partitioning air stream to any selected one of the bores in said pack.

2. The combination as recited in claim 1, wherein said select means is arranged and adapted to establish an array of different jet-inject sites along a prescribed selection plane extending axially away from said pack;

this select means being operatively combined with jet-distributor means arranged in pneumatic communication between said array of pack bores and this array of inject-sites;

this arrangement being thus adapted to selectively direct a partition jet of pressurized air through a selected one of said sites and a corresponding bore whereby to open a prescribed partition gap between any pair of disks.

3. The combination as recited in claim 2, wherein said Distributor means includes an array of pneumatic ducts, each duct adapted to register, at an "outlet-end" thereof, with a respective pack-bore, and to also register, via an inlet-port, at an opposite, "inlet-end" thereof, with a respective one of said select sites; each inlet port being adapted to communicate between its respective duct and a corresponding respective inlet-site adjacent the exterior of said Distributor means; said select means being adapted to selectively couple pressurized air streams to any selected one of these inlet ports, and so send a partitioning air pulse through the associated bore to exit at the associated inter-disk gap.

4. The invention in accordance with claim 2, wherein like spacer washers are interleaved between the disks and are partition-apertured to generate said bores.

5. The combination as recited in claim 1, wherein said conduction means comprises a ducted cylinder; and wherein said select means comprises a non-rotating sleeve including jet port means adapted to selectively communicate with a selected one of the ducts in said cylinder.

6. The combination as recited in claim 5, wherein said duct means comprises a cylinderical post including an array of duct-bores, this post being adapted to be attached to, and co-rotated with, said pack so that each of said duct-bores is registered pneumatically at a first end thereof, with a respective one of said pack-bores, while the opposite end of each said duct-bore terminates at an inlet-port; and wherein said select means comprises a relatively nonrotatable sleeve including jet outlet means adapted to be registered with any selected one of said inlet ports and to selectively direct a partitioning pressurized air jet thereto and along the associated duct-bore conduit.

7. The combination as recited in claim 6, wherein said ducted post includes an array of like, parallel peripheral intake grooves distributed along a portion of its length, each said groove communicating with a respective one of said inlet ports; and wherein said select sleeve means includes outlet port means adapted to be placed in pneumatic communication with any selected one of said grooves.

8. The combination as recited in claim 7, wherein said select sleeve is adapted to be translated linearly and axially of said ducted post so as to selectively place said outlet port means in pneumatic communication with one of said grooves.

9. The combination as recited in claim 8, wherein said select means also includes inject means adapted to inject pressurized air through said outlet port means via intermediate valve means and associated extensible tube means responsive to a "partition signal".

10. The combination as recited in claim 9, wherein said select sleeve comprises a hollow cylinder including outlet port means arrayed along its inner wall and adapted to be coupled in air-tight registry with any selected one of said grooves on said ducted cylinder, said outlet means being coupled to pressurized air via said extensible tube and said valve means;

said cylindrical sleeve further including a plurality of breather slots extending axially down the inner surface of the cylinder and adapted for conducting ambient air to the "non-selected" ducts in the ducted cylinder;

said slots being plugged above and below said outlet port means to isolate ambient air from the high pressure air conducted therethrough.

11. The combination as recited in claim 10, as combined with a flexible disk pack of the type recited and including partition-apertured spacers between the disks, the spacers and disks being stacked and apertured such as to generate said array of partition-bores axially of the pack, and arranged circumferentially adjacent its hub, with each bore terminating at a different respective inter-disk gap.

12. The combination as recited in claim 8, wherein said select sleeve comprises a hollow cylinder including outlet port means arrayed along its outer wall and adapted to be coupled in air-tight registry with any selected one of said grooves along the inner face of said ducted cylinder, said outlet means being coupled to pressurized air via valve means;

said cylindrical sleeve further including a plurality of breather slots extending axially down the inner surface of the cylinder and adapted for conducting ambient air to the "non-selected" ducts in the ducted cylinder;

said slots being plugged above and below said outlet port means to isolate ambient air from the high pressure air conducted therethrough.

13. The arrangement as recited in claim 1, wherein said disks and their intermediate spacers present a pattern of partition apertures, the disks and spacers being stacked so that predetermined ones of apertures are superposed in registry whereby at least one set of said partition bores are generated from a respective end of the stack, each such bore terminating at a different inter-disk gap.

14. The combination as recited in claim 3, wherein said select means comprises a jacket disposed about said Distributor means and is fixed with respect thereto, linearly as well as rotationally, said jacket including a plurality of jet outlet ports, each outlet port being coupled individually to a source of pressurized air through a respective select valve means, so that selection and pressurizing of a given jet duct of said Distributor means can be accomplished solely by activation of a respective one of these select valves without need for any translation of the sleeve or other part, these ducts being pressurized and disk partition being induced either serially and one at a time, or simultaneously and in parallel, according to one's desire.

15. The combination as recited in claim 14, wherein each of the said select valves are also vented to ambient air and are arranged to so vent a "non-selected" ductregistering bore system to isolation air pressure without interfering pneumatically with the pressurizing of the "selected" duct-bore system.

16. The combination as recited in claim 1, wherein said conduction means comprises a cylinder including an array of axially-directed elongate ducts, each duct adapted to register with one of said pack-bores and extending a different respective distance down the cylinder length to terminate at a respective inlet port means;

said duct length and the associated inlet port location being selected so as to distribute an array of associated "jet-intake-sites" along the length of said cylinder and thus accommodate a prescribed partition select mode—in effect, amplifying the inter-disk gap separation for partition purposes and thereby facilitating a convenient reliable partition selection with relatively simple means.

17. The combination as recited in claim 2, wherein said select means is disposed external to said pack and includes select control means adapted to direct a pressurized air jet to at least one of said sites by way of effecting a "partition-select" operation;

and wherein said conduction means comprises an array of air conduits, each conduit registering with a particular one of said bores and coupling it pneumatically to a respective one of said sites;

said conduction means being so-rotated with said pack while being arranged to maintain relatively air-tight coupling relation with the jet-entry partition of said select means at said respective site.

18. The combination as recited in claim 17, wherein said conduction means comprises a cylinder with said conduits disposed circumferentially about its interior and extending axially thereof, each conduit terminating at a different respective entry-site along the cylinder length, with an entry port means provided at each entry-site and adapted to be coupled in air-sealed relation with said jet-entry portion at least during select-pressurizing thereof.

19. The combination as recited in claim 18, wherein said select means comprises a cylindrical manifold surrounding said Distributor means plus an array of jet input-conduit means, each coupled, through a respective select valve means included therein, to a source of pressurized air and adapted to selectively present a jet stream of pressurized partition air to a respective corresponding conduit at the entry-site thereof; said select means further including an associated array of eject port means disposed fixedly operatively adjacent said sites in air-sealed pneumatic communication with an associated conduit; said select means thus being kept spatially fixed with respect to said Distributor means, both rotationally and linearly, and effecting partition-select simply by operation of one or more of said valve means.

20. The combination as recited in claim 17, wherein said select means comprises a non-rotating, relatively cylindrical element disposed in sleeve-post relation with said conduction means, said sleeve including jet outlet means adapted to be translated linearly along the locus of said inject-sites, while also being arranged to be coupled in air-tight relation with a respective one of said conduits and connected bore whereby to present a partitioning air stream thereto.

21. The combination as recited in claim 20, wherein said select sleeve comprises an outer sleeve surrounding said Distributor means.

22. The combination as recited in claim 20, wherein said select sleeve comprises an inner hollow post surrounded by said Distributor means.

23. The combination as recited in claim 22, wherein said select post includes vent means adapted to introduce ambient air to "non-selected" unpressurized conduits without distrubing said pressurization.

24. The combination as recited in claim 21, wherein said select sleeve includes vent means adapted to introduce ambient air to "non-selected" unpressurized conduits without distrubing said pressurization.

25. The combination as recited in claim 19, wherein said valve means are also adapted to automatically vent their associated conduit-bore-gap system to ambient air during non-partitioning periods.

26. An "end-wise partitioned" disk drive comprising:
a plurality of flexible recording disks and intermediate spacer means, all apertured so as to generate an array of partition bores, each communicating with a different respective inter-disk gap;
axially offset pneumatic partition means adapted to partition the pack and expose a selected disk surface by selectively directing a jet of pressurized air through a selected one of said bores;
said partition means being disposed outside the confines of the pack and characterized by ducted Distributor means and by associated duct-select means adapted to direct such jets into a selected duct and associated communicating bore.

27. The combination as recited in claim 26, wherein said Distributor means is adapted to be co-rotated with the pack, while said select means is kept non-rotating.

28. The combination as recited in claim 27, wherein each duct terminates, externally, in a respective entry port means and wherein said select means effects this duct selection by controlled translation to the associated entry port means.

29. The combination as recited in claim 27, wherein each duct terminates, externally, in a respective entry port means; and wherein said select means includes an array of air-inject means each permanently and fixed coupled in sealed relation with a respective entry port and selectively operable to send partitioning air therethrough, the duct-selection being effected by activating said valve means.

30. An improved method of partitioning a flexible disk pack which includes an array of partition bores extending axially, end-wise of the pack, this method comprising the steps of:
arranging Distributor conduit means adjacent the pack to co-rotate therewith, this conduit means including an array of conduits each in registry with a respective one of said partition bores and extending axially away from the pack to a respective entry-site, each site being disposed at a different respective position relative to said pack;
providing an associated, non-rotating select means adapted to present a selectively present pressurized air at any selected entry-site;
and automatically selecting said site corresponding to a given partition gap in pneumatic communication therewith by operating said select means to provide a pressurized air stream to the corresponding conduit and so beging opening the partition gap.

31. The combination as recited in claim 30, wherein said air stream is injected and kept "on" at a prescribed elevated pressure above ambient pressure to "open" said gap and hold it open; and said pressure is lowered substantially to "close" the gap.

32. The combination as recited in claim 30, wherein said select means comprises a stationary array of air inject means, each being selectively-operable to couple a source of pressurized air to the corresponding entry port and conduit, being disposed in air-tight relation therewith, thus effecting partitioning at any gap by simply activating the corresponding inject means.

33. The combination as recited in claim 32, wherein each said inject means comprises pneumatic valve means selectively operable to present said pressurized air stream to the associated conduit or, alternatively, to present ambient air pressure and isolation air to the respective gap at "non-select, non-partitioning" times.

34. The combination as recited in claim 30, wherein said select means is arranged to comprise a single outlet means fixed on an associated linearly-translatable cylindrical carrier and adapted to be coupled in air-tight relation with any selected one of said conduit in said Distributor means; and
wherein said carrier is translated linearly to register said outlet means with the entry-site corresponding to the subject gap to be partitioned;
and then applying said pressurized air to begin partitioning.

35. The combination as recited in claim 34, wherein said select means further includes isolation air slots adapted to be functionality isolated from the pressurized air flow and to selectively couple "non-selected" conduits and gaps to ambient air.

36. The method recited in claim 35, wherein partition and selection is effected by arranging said carrier to surround said Distributor as a linerly-translatable sleeve.

37. The method as recited in claim 35, wherein the carrier is arranged to be nested within the Distributor means.

38. In an improved arrangement for penumatic partitioning of a pack of floppy disks, this pack including conduit means for directing a partitioning air stream axially and up through the pack to introduce a partitioning gap between selected disks; this arrangement comprising:
external pneumatic partitioning means disposed outside the confines of said pack and displaced axially therefrom;
the partitioning means being adapted to present the partitioning air stream to said conduit means so as to partition the pack between prescribed selected disks.

39. The combination as recited in claim 38, wherein said partitioning means comprises:
a distributor body disposed adjacent said conduit means and incorporating channel means therethrough which includes an array of elongate channels directed through said body so as to extend relatively parallel with the axis of said pack, being adapted to project said partitioning air stream, each channel being adapted and aligned to register with a respective conduit portion of said conduit means; and also comprises;
injection means disposed operatively adjacent said body and adapted to direct the partitioning air stream into a selected one of said channels in the body according to the desired partitioning and the associated gap and conduits involved.

40. The combination as recited in claim 39, wherein said distributer body is co-rotated with said pack and thus arranged to bring each channel therein into registry, and pneumatic conductive relation, with an associated conduit in the pack.

41. The combination as recited in claim 40, wherein said injection means is adapted to be translated axially of said body to effect partition-selection.

42. The combination as recited in claim 40, wherein said injection means is kept immobile relative to said body and includes input valve means adapted to cooperate with said channels in making the partition selection.

43. The arrangement as recited in claim 38, as combined with said disk pack.

44. The combination as recited in claim 43, wherein the floppy disks comprising said pack are provided with an array of partition apertures to form the conduit means.

45. The combination as recited in claim 44, wherein said pack is provided with spacers between each disk and wherein the spacers and disks are both apertured to provide said conduit means.

46. In an improved arrangement for end-wise partitioning of a pack of floppy disks, this pack including conduit means for conduction of partitioning force axially, up through the pack, to introduce a prescribed partition gap between selected adjacent disks; the arrangement comprising:
partitioning means arranged and adapted to selectively present partitioning thrust forces into at least a portion of said conduit means so as to introduce said gap between any selected adjacent pairs of said disks.

* * * * *

UNITED STATES PATENT AND TRADEMARK OFFICE
CERTIFICATE OF CORRECTION

PATENT NO. : 4,167,029

DATED : September 4, 1979

INVENTOR(S) : Herbert U. Ragle etal.

It is certified that error appears in the above—identified patent and that said Letters Patent is hereby corrected as shown below:

```
Col.  1, line 23, change "4,131,443." to --4,134,143.--;
        line 48, change "wellknown" to --well known--.
Col.  5, line 24, change "shown" to --known--.
Col. 10, line 29, change "the while" to --thewhile--.
Col. 12, line 65, change "the while" to --thewhile--;
        line 68, change "the while" to --thewhile--.
Col. 13, line 12, change ""selective-sleeve"" to
                         --"select-sleeve"--;
        line 44, change "embodiments." to --embodiment.--.
Col. 14, line 21, change "valve" to --valves--.
Col. 15, line 52, change "modification" to  --modifications--.

Col. 18, line  6, change "tregistering" to --t-registering--;
        line 33, change "so-rotated" to --co-rotated--.
Col. 19, line 12, change "distrubing" to --disturbing--;
        line 16, change "distrubing" to --disturbing--.
Col. 20, line  2, change "beging" to --begin--.
```

Signed and Sealed this

Twenty-fifth Day of December 1979

[SEAL]

Attest:

SIDNEY A. DIAMOND

Attesting Officer

Commissioner of Patents and Trademarks